United States Patent [19]

Tomasic et al.

[11] Patent Number: 5,405,098
[45] Date of Patent: Apr. 11, 1995

[54] CONTROL DEVICE FOR THE DRIVE OF A REEL

[75] Inventors: Marko Tomasic, Buckenhof; Uwe Schaefer, Moehrendorf-Kleinseebach; Erwin Teltsch, Neunkirchen, all of Germany

[73] Assignee: Siemens Aktiengesellschaft, Munich, Germany

[21] Appl. No.: 90,596

[22] Filed: Jul. 13, 1993

[30] Foreign Application Priority Data

Jul. 13, 1992 [DE] Germany .................. 42 23 002.0

[51] Int. Cl.⁶ .............................................. B65H 23/198
[52] U.S. Cl. ............................ 242/413.1; 242/413.5
[58] Field of Search ................ 242/75.51, 75.52, 75.53, 242/57, 413.1, 413.2, 413.5, 334.2

[56] References Cited

U.S. PATENT DOCUMENTS

| | | | |
|---|---|---|---|
| 3,713,009 | 1/1973 | Poppinger et al. | 242/75.51 X |
| 3,871,598 | 3/1975 | Kataoka | 242/75.51 |
| 4,347,993 | 9/1982 | Leonard | 242/75.51 |
| 4,966,333 | 10/1990 | Bosch | 242/75.51 |

FOREIGN PATENT DOCUMENTS

| | | |
|---|---|---|
| 0477422 | 4/1992 | European Pat. Off. . |
| 2201142 | 4/1974 | France . |
| 4010352 | 10/1991 | Germany . |

*Primary Examiner*—John M. Jillions
*Attorney, Agent, or Firm*—Kenyon & Kenyon

[57] ABSTRACT

A control for a drive reel partitions the reel into a plurality of angle-of-rotation segments. Compensation signals are produced by detecting deviations from a selected parameter at each of said segments. The compensation signals result from subjecting the deviations to integration wherein a plurality of integrators are included for this purpose, one for each of the segments.

6 Claims, 1 Drawing Sheet

CONTROL DEVICE FOR THE DRIVE OF A REEL

BACKGROUND OF THE INVENTION

The present invention relates to a control device for the drive of a reel or the like. The control is intended to maintain a constant or preset course of tension in the web of material to be wound up. European Patent Application 04 77 422 discloses one type of reel drive control device.

The Applicants have noted that upon the winding up of steel strips there results the problem that an increase in height results on the reel due to the clamping of the steel strip in the clamping slot. The increase in height leads to abruptly changing reel diameters upon the winding and unwinding of the strip. This abruptly changing reel diameter constitutes a deviation from a continuously developing diameter on which the setpoint input is based. The changes in diameter in turn cause deviations in the speed of the strip. As a result thereof, variations in the strip tension occur which in turn can lead to undesired defects in thickness.

The disturbance in the course of the tension is repeated periodically upon each revolution. Its frequency is thus a function of the rotational speed.

SUMMARY OF THE INVENTION

The present invention addresses this problem of disturbances especially in the case disturbances which are repeated periodically upon each rotation.

According to the present invention the problem is solved by dividing each complete revolution into several angle-of-rotation segments and by using the deviation from a preset value detected and integrated for each angle-of-rotation segment as compensating signal for the control.

From the standpoint of circuit engineering, an integrator can be provided for each angle-of-rotation segment of for instance 15°. The inputs of such integrators can then be connected as a function of the angle of rotation to a signal which is proportional to the deviation at the time. The output signals are advanced in time, for instance fed to the control as compensating signals depending on the individual dead time behavior. As deviation signals there can in this case be used for instance deviations in the tensile force, the torque and/or the reel diameter and they can be assigned to the angle-of-rotation segment in question. The output signals can be fed to a circuit for signal processing. In this connection there can for instance be effected an interpolation, differentiation, combining of several segments, smoothing, etc. and the signals formed in this manner can be used for the compensation.

If, as mentioned at the start, the amplitude of the disturbance is also dependent on the rotational speed, this can be taken into account also by changing the amplitude of the compensating signals as a function of the rotational speed.

BRIEF DESCRIPTION OF THE DRAWINGS

The invention will be described in greater detail with reference to an embodiment shown in the drawing, in which.

DETAILED DESCRIPTION

Figure 1:
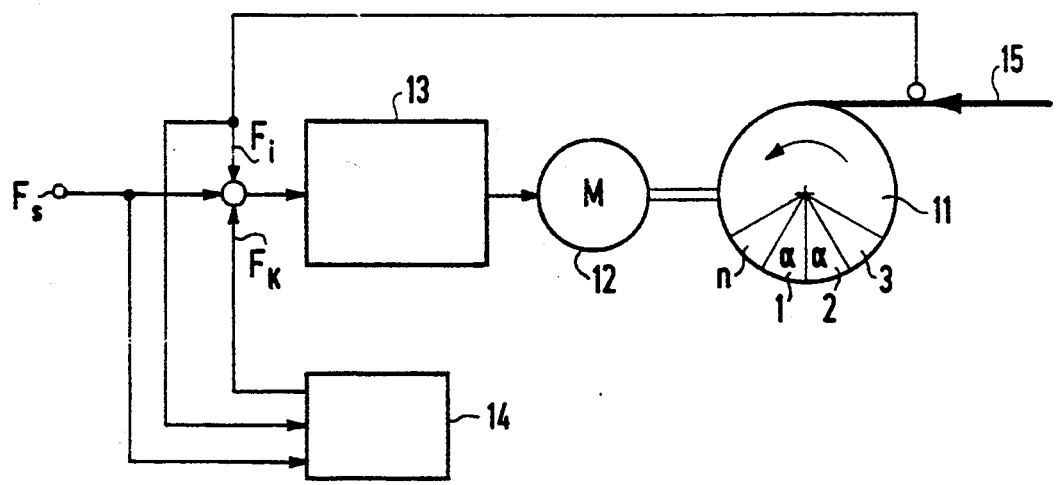
FIG. 1 is a block diagram of an overall control arrangement in accordance with an embodiment of the present invention.

As can be noted from FIG. 1, a steel strip 15 is to be wound on a reel 11. The reel 11 is driven by an electric motor 12 that receives its trigger commands from a control element 13 which provides control of the tensile force and strip speed. The control element 13 receives, inter alia, a setpoint value for the strip tension $F_s$ and a signal which is proportional to the actual value of the strip tension $F_i$. It then processes said signals. Such a control is known as a whole, for instance from the above-mentioned patent application. In addition the setpoint value and actual value of the strip tension are also fed to a compensating circuit 14 which calculates compensating values $F_K$ for the control. These compensating values differ in that they depend on the angle of rotation of the reel, i.e., each circumferential part (zone) 1, 2, 3, etc. up to n on the reel 11 has assigned to it a corresponding angle-of-rotation segment $\alpha$.

Circumference-dependent disturbances, the frequency of which is a function of the rotational speed, can no longer be corrected by a single integrator since the closed control circuit has a corner frequency which is too low. However, if the disturbance is known, a suitable pre-control can assure that the disturbance compensation is connected at the proper time. Subject to the prerequisite that the disturbance changes only slowly, it can be assumed that within two successive revolutions the disturbance remains practically constant at one place. If a disturbance integrator is now employed for this particular place, it notes a constant control deviation which it can reduce by integration. For the n-zones on the circumference, i.e., for the n-angles of rotation $\alpha$ there must also be used n-integrators which integrate the control defect as a function of the angular position. The periodic disturbance is then reflected in the n-integrator contents. As an example, 24 integrators can be used where the reel is considered portioned into 24 sections or zones. Since the system has dead times and the control has a low pass behavior, the outputs of the integrators may not be connected only when the system is in its integration interval. Their effect would then come too late. Instead, one must look into the future by a lead angle. This lead angle results as a function of the rotational speed as $$\alpha_v = T_v n_i + \alpha_o$$

in which $n_i$ is the instantaneous speed of rotation of the reel 11, $T_v$ is the lead time and $\alpha_o$ a constant offset angle.

Figure 2:
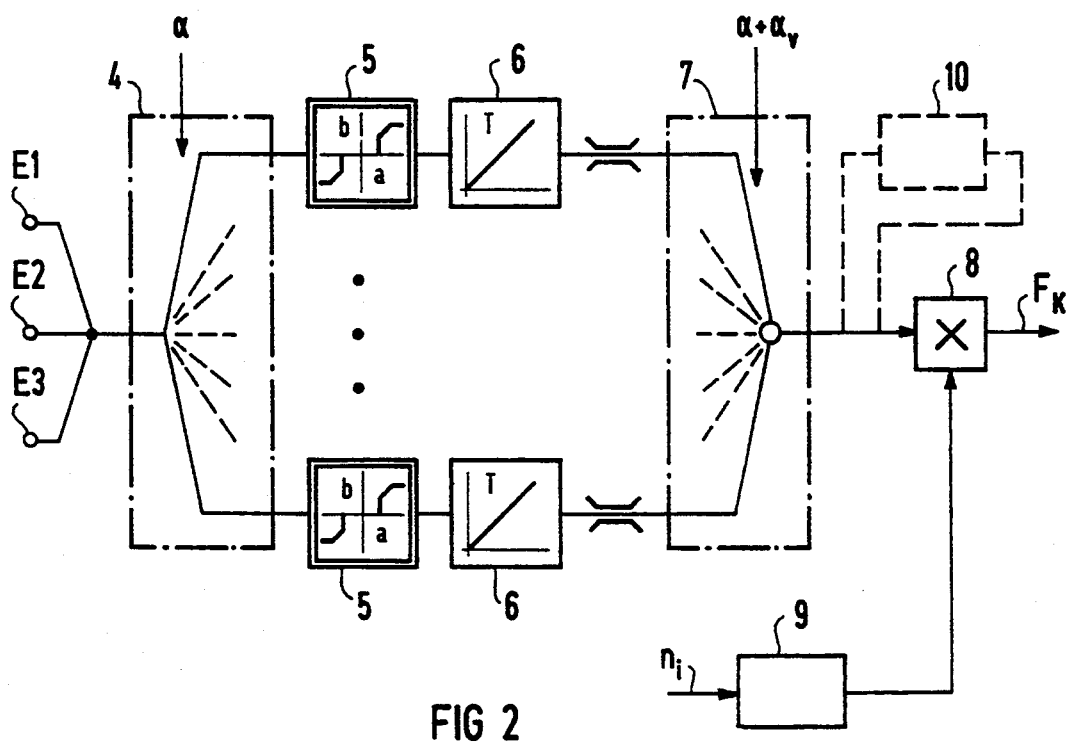
FIG. 2 shows a structure of a circuit for producing compensating signals in connection with the control envisioned by the present invention.

FIG. 2 shows a circuit configuration for realizing the above-mentioned strategies. At the inputs E1, E2, E3 (FIG. 2) there can be applied as desired a signal which is proportional to the difference between setpoint value and actual value of the strip tension $F_s - F_i$, or proportional to the difference of the instantaneous setpoint value and the instantaneous actual value or proportional to the difference between setpoint diameter and actual diameter, which signal can of course be different in each angle-of-rotation segment. The input deviation signal is connected to the individual integrators 6 having a time constant T. This connection is made using a multiplexer 4 operating in dependence upon the angle of rotation. In order not to integrate all disturbances, a limiting element 5 is connected in each case in front of the integrators which allows a signal to pass only if it satisfies certain conditions.

The limited outputs of the integrators 6 are then assigned to the control device 13 as corresponding compensating signal $F_k$ via a demultiplexer 7, which also operates under the influence of the angle of rotation, namely corresponding to the above-mentioned relationship, by a lead angle $\alpha_v$. In order not to have excessively large jumps in the sequence of the individual compensating values, it may be advisable to smooth between the individual values.

Depending on the type of the input signal (tensile force, wave moment or diameter) a differentiation of the outputs of the integrators may also be appropriate. An interposed signal processing circuit 10—shown in dashed lines could be included to provide such differentiation.

Since, in the specific case of the reel lay with periodic disturbance, the amplitude of the disturbance can also be dependent on the rotational speed, the compensating signal is weighted with a speed-dependent function in an element 8. In this way, the integrators are relieved and a rapid adaptation to the actual disturbance level is effected. This takes place by speed-dependent connection $f = c \cdot n_i + \alpha$ via a computing element 9, the constants c and $\alpha$ containing, inter alia, the integrator compensating time and standardization values. It may also be mentioned that the integrators are switched in such a manner that a constant error is suppressed. Instead of the hardware realization shown, it is also possible to implement the individual integrators by means of software on one or several computers.

What is claimed is:

1. In a control device for driving a reel which includes disturbances distributed over the circumference of the reel where disturbance values are periodically repeated upon each revolution the improvement comprising:

means for partitioning a plurality of angle-of-rotation segments of the reel;

means for detecting a deviation from a preset value for each of said plurality of angle-of-rotation segments; and means for integrating each detected deviation and means for producing a compensating signal for the control based on said integrated deviation.

2. The control according to claim 1 wherein said means for integrating includes a plurality of integrators, each integrator being assigned to a separate one of said plurality of angle-of-rotation segments, and wherein inputs of said integrators can be connected, as a function of the angle of rotation, in succession to a signal which is proportional to the detected deviation and the output values of the integrators are output shifted in time with respect to the input signals as compensating signals.

3. The control device according to claim 1 wherein the detected deviation is selected from the group of parameters including the tensile force, torque and/or reel diameter.

4. The control device according to claim 1 further comprising means for smoothing by interpolation a sequence of the compensating signals produced by said means for producing compensating signals.

5. The control device according to claim 1 further comprising means for changing the amplitude of the compensating signal in accordance with a change in the speed of the reel.

6. The control device according to claim 1 further comprising means for differentiation of compensating signals produced by said means for producing a compensating signal to produce a differentiated signal which is a component of an output compensating signal.

* * * * *